Nov. 29, 1960 K. F. SCHLICHTING 2,961,697
METHOD OF MECHANICALLY HEADING FISH
Filed Dec. 20, 1957 3 Sheets-Sheet 1
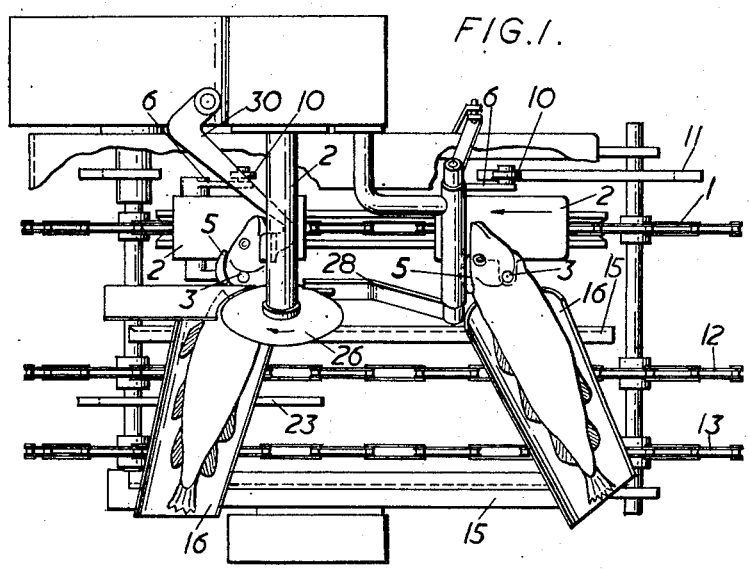
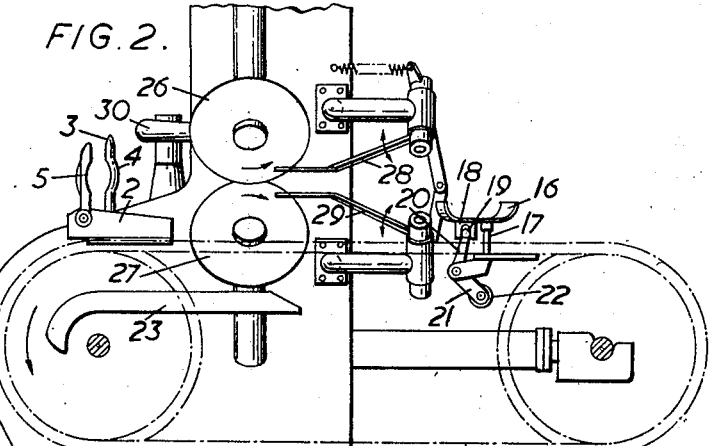
INVENTOR
K. F. SCHLICHTING, DECEASED
BY ANNA SCHLICHTING
KATHE LISKE
KARL SCHLICHTING
LEGAL HEIRS
Attorneys

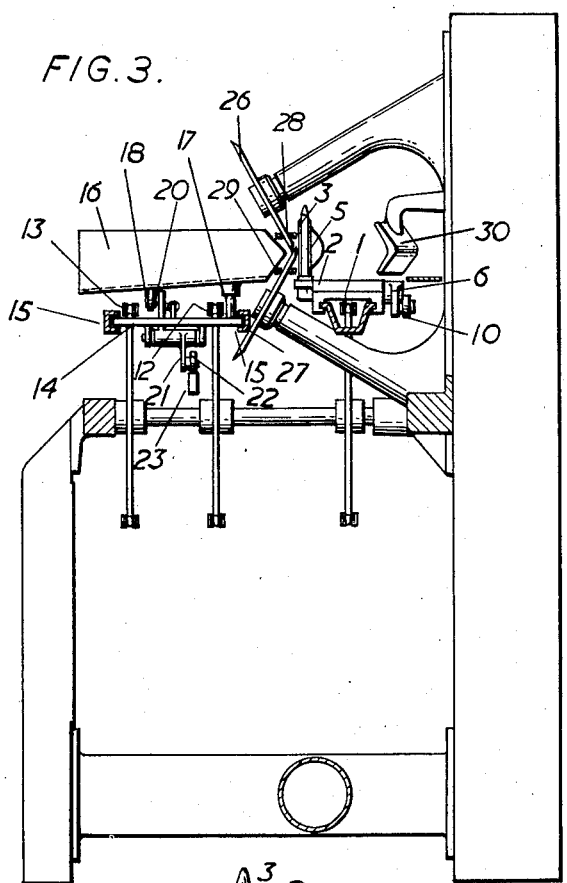
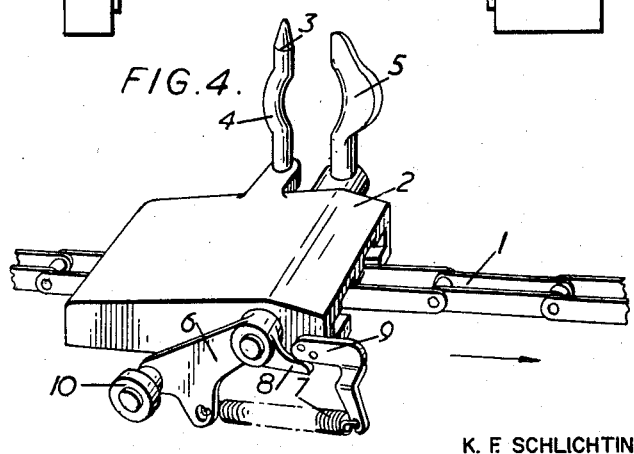

Nov. 29, 1960 K. F. SCHLICHTING 2,961,697
METHOD OF MECHANICALLY HEADING FISH
Filed Dec. 20, 1957 3 Sheets-Sheet 3
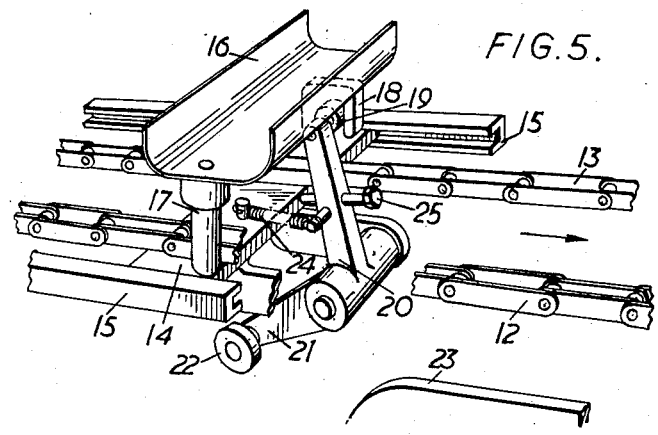
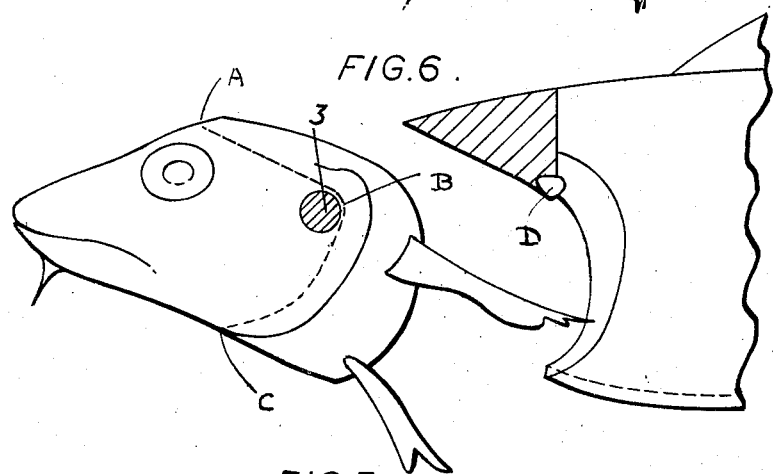
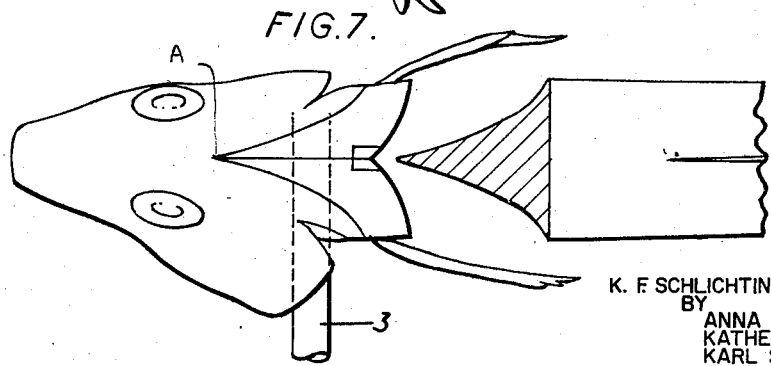
INVENTOR
K. F. SCHLICHTING, DECEASED
BY ANNA SCHLICHTING
KATHE LISKE
KARL SCHLICHTING
LEGAL HEIRS
By Richards & Geier
Attorneys

United States Patent Office 2,961,697
Patented Nov. 29, 1960

2,961,697
METHOD OF MECHANICALLY HEADING FISH

Karl Friedrich Schlichting, deceased, late of Lubeck, Germany, by Anna Schlichting, born Priess, Lubeck, Kathe Liske, born Schlichting, Scharbeutz, and Karl Schlichting, Lubeck, Germany, legal heirs, assignors to Firma Nordischer Maschinenbau Rud. Baader, Lubeck, Germany, a firm of Germany Filed Dec. 20, 1957, Ser. No. 704,174
Claims priority, application Germany Dec. 22, 1956
1 Claim. (Cl. 17—45)

This invention relates to the mechanical dressing of fish and is concerned with the problem of recovering as much as possible of the flesh at the head end of the fish when the head is cut off.

When the head of a fish is cut off by either a rotary or a guillotine knife the cut is always made in a straight line. If it is made so that as little as possible of the flesh of the neck is lost, then more flesh than necessary is removed from the belly flaps, and vice versa. Little is gained by using two knives cutting into the fish from opposite sides and making wedge-shaped cuts, as only a small additional part of the flesh at the neck is then recovered.

This loss of flesh is particularly galling in the mechanical filleting of fish, since this art has advanced so far that there is practically no loss of flesh in the removal of the backbone and fins to leave the fillets. On heading, however, particularly with cod and similar fish, as much as 5% or even more of the possible fillets is lost as flesh remaining on the back of the head at that part which can most conveniently be called the neck.

An object of this invention is to produce a method by which flesh previously lost at the back of the head during mechanical dressing can be recovered.

Another object of the invention is to provide improved apparatus for cutting off the head of a fish.

According to the invention wedge cuts beginning immediately behind the eyes are made from the back into the fish symmetrically to its central plane while it is engaged at the gills below the backbone, the cuts severing the backbone, and the fish is thereupon rocked about its point of engagement and the head is fully severed from the body by further cuts immediately behind the gill bones, that is to say, the bones on which the gills rest.

Preferably the fish is engaged at the pivotal or rocking axis by being impaled on a spike passing through the gills.

The preferred apparatus according to the invention is shown in the accompanying drawings, in which:

Figure 1 is a plan;
Figure 2 an elevation and
Figure 3 is an end view partly in cross-section of the apparatus;
Figures 4 and 5 are perspective views of two parts of the apparatus; and
Figure 6 is a side view and
Figure 7 a plan of the headed fish.

The apparatus comprises two conveyors, one of which conveys the head and the other the body of the fish. The conveyor for the head comprises an endless conveyor chain 1 to which plates 2 are fixed at appropriate distances apart from one another. Each plate 2 carries an upstanding pin 3 at one side. The pin 3 is curved over its central part, as shown in Figure 4, and constitutes a spike on which the fish is impaled, the point of the pin passing through the gills and the curved part fitting snugly round the underside of the backbone. A clamping lever 5 is provided close to the pin 3 and projects upwards from a horizontal rod which passes through the plate 2 and which can be rocked about its axis by an arm 6 fixed to it. The clamping lever 5 is shaped to engage the back of the head of the fish and clamp it against the pin 3. The pin 3 and lever 5 together ensure that the head of the fish is held at the proper height. The lever 5 is urged towards the pin 3 by a tension spring 7 anchored at one end to the arm 6 and the other end to a bracket 9 fixed to the plate 2 and serving also as an abutment for a nose 8 on the arm 6, the movement of the lever 5 towards the pin 3 thus being limited.

In order to move the lever 5 away from the pin 3 to receive the head of a fish, a roller 10 is provided on the arm 6 to run onto a cam 11 as the plate 2 begins its upper run through the apparatus. Figure 1 shows two plates 2, the lever 5 carried by the right-hand plate being in the open position, and the lever 5 carried by the left-hand plate being in the closed position and bearing on the head of the fish.

The conveyor for the body of the fish comprises two endless conveyor chains 12 and 13 to which carrier plates 14 are fixed at distances apart from one another corresponding to the plates 2. The side edges of these plates 14 enter channels in guide rails 15 throughout that part of the run in which the fish are being cut. Each plate 14 carries a vertical pivot pin 17 which enters a socket on the underside of, and close to one end of, a trough-shaped holder 16. Thus, each holder 16, which receives the body of the fish, can rock about a vertical axis. A forked member 18 is fixed to the underside of the holder 16 at a point remote from the pin 17 and embraces a roller 19 carried by one arm 20 of a bell-crank lever, the other arm 21 of which carries a roller 22 that engages a cam 23. The bell-crank lever is held by a spring 24 in its normal position (that in which the right-hand holder is shown in Figure 1). This position is determined by a set-screw 25 and so is adjustable. As soon as the roller 22 runs onto the cam 23 the holder 16 is rocked through the bell-crank lever and the fork 18. In Figure 1 the left-hand holder 16 is shown in the rocked position. The holder returns to its normal position directly the roller 22 runs off the cam 23.

The movement of the head of the fish on rocking is limited by a lever 30 which is swung under the action of a cam (not shown) between a position in which it is clear of the path of the fish and the position shown in Figure 1.

Two rotary circular knives 26 and 27 mounted about axes inclined to one another are provided for making the wedge cuts, one from above and the other from below the fish. The fish must be presented to these knives exactly at the right height with its central horizontal plane symmetrically between the knives. For this purpose two synchronously controlled guides 28 and 29 are provided, each being slotted to overlap one of the knives. The ends of the holders 16 pass on one side of these guides, and the plates 2 pass on the other side. The part of each fish spanning the distance between the holder 16 and a plate 2 passes between the guides and is centered by them. The guiding continues during the whole of the cutting.

In operation the fish is impaled at the gills on the pin 3 and lies in the position shown in the holder 16 at the right hand of Figure 1. The clamp formed by the pin 3 and the clamping lever 5 is open, but closes immediately the holder 16 moves onwards. The unsupported part of the fish then passes between the guides 28 and 29 and is brought to a symmetrical position relative to the knives 26 and 27. These knives then begin their cutting directly behind the eyes, at the point A indicated in Figures 6 and 7. As soon as the backbone D is cut through at the point B, the holder 16 is swung into the left-hand position shown in Figure 1, the head being somewhat bent back by the lever 30. As a result the knives now complete their cuts along the line B—C in Figure 6.

The part of the fish gained by means of the invention, i.e. that part which hitherto has been left on the head, is shown by cross-hatching in Figures 6 and 7.

What is claimed is:

A method of mechanically heading fish for the purpose of leaving the fish at the neck attached to the body, said method comprising impaling the fish through the gills and while the fish is impaled making wedge cuts through the backbone beginning immediately behind the eyes from the back into the fish symmetrically and at an acute angle to the central plane of the fish, and immediately the backbone has been severed rocking the fish about the impaling axis and then cutting off the head of the fish from the body by further cuts immediately behind the gill bones.

References Cited in the file of this patent

UNITED STATES PATENTS

| | | |
|---|---|---|
| 1,222,926 | Brierly et al. | Apr. 17, 1917 |
| 1,909,643 | Waugh | May 16, 1933 |
| 2,234,658 | Smith | Mar. 11, 1941 |
| 2,433,460 | Kurzbin | Dec. 30, 1947 |
| 2,529,920 | Danielsson | Nov. 14, 1950 |
| 2,771,633 | Bartels et al. | Nov. 27, 1956 |

FOREIGN PATENTS

| | | |
|---|---|---|
| 768,384 | Great Britain | Feb. 13, 1957 |